US010048460B2

(12) United States Patent
Courchaine et al.

(10) Patent No.: US 10,048,460 B2
(45) Date of Patent: Aug. 14, 2018

(54) FIELD INSTALLABLE OPTICAL MODULE WITH CONFIGURABLE CABLE ATTACHMENT

(71) Applicant: AFL Telecommunications LLC, Duncan, SC (US)

(72) Inventors: Wilfred J. Courchaine, Moore, SC (US); Steve Polidan, Simpsonville, SC (US); Phillip Turner, Greenville, SC (US); Matthew Johnston, Simpsonville, SC (US); Roger Vaughn, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/430,645

(22) PCT Filed: Sep. 30, 2013

(86) PCT No.: PCT/US2013/062631
§ 371 (c)(1),
(2) Date: Mar. 24, 2015

(87) PCT Pub. No.: WO2014/052963
PCT Pub. Date: Apr. 3, 2014

(65) Prior Publication Data
US 2015/0234142 A1 Aug. 20, 2015

Related U.S. Application Data

(60) Provisional application No. 61/762,488, filed on Feb. 8, 2013, provisional application No. 61/707,643, filed on Sep. 28, 2012.

(51) Int. Cl.
*G02B 6/00* (2006.01)
*G02B 6/255* (2006.01)
*G02B 6/44* (2006.01)

(52) U.S. Cl.
CPC ........... *G02B 6/4454* (2013.01); *G02B 6/444* (2013.01)

(58) Field of Classification Search
CPC .. G02B 6/4452; G02B 6/3897; G02B 6/4455; G02B 6/4446; G02B 6/4453; G02B 6/4454; G02B 6/444
(Continued)

(56) References Cited

U.S. PATENT DOCUMENTS 5,870,519 A 2/1999 Jenkins et al.
5,911,027 A 6/1999 Macken et al.
(Continued)

FOREIGN PATENT DOCUMENTS

WO WO2009/045396 A2 4/2009
WO 2012/114081 A2 8/2012

OTHER PUBLICATIONS

AFL Telecommunications LLC, European Application No. 13841228.3; supplementary European Search Report; dated Mar. 17, 2016; (2 pages).
(Continued)

*Primary Examiner* — Kaveh C Kianni
*Assistant Examiner* — Hung Lam
(74) *Attorney, Agent, or Firm* — Dority & Manning, P.A.

(57) ABSTRACT

A cable adaptor case for sorting a first plurality of cables and adapting a plurality of types of cables comprising a cable tray for holding cables, an adaptor tray for adapting a first plurality of cables to a second plurality of cables, and a lid which is removably attached and hingably attached to the cable tray.

19 Claims, 13 Drawing Sheets

(58) Field of Classification Search
USPC .................................... 385/95, 99, 134–137
See application file for complete search history.

(56) References Cited

U.S. PATENT DOCUMENTS

| | | | |
|---|---|---|---|
| 2006/0067636 A1* | 3/2006 | Bludau | G02B 6/4453 |
| | | | 385/135 |
| 2008/0175554 A1* | 7/2008 | Coburn | G02B 6/4459 |
| | | | 385/136 |
| 2009/0097813 A1* | 4/2009 | Hill | G02B 6/4454 |
| | | | 385/135 |
| 2010/0142910 A1 | 6/2010 | Hill et al. | |
| 2010/0329620 A1 | 12/2010 | Griffiths et al. | |
| 2011/0317974 A1 | 12/2011 | Krampotich | |
| 2012/0134639 A1 | 5/2012 | Giraud | |

OTHER PUBLICATIONS

International Search Report for PCT/US2013/062631 dated Feb. 27, 2014.

* cited by examiner

FIG. 2
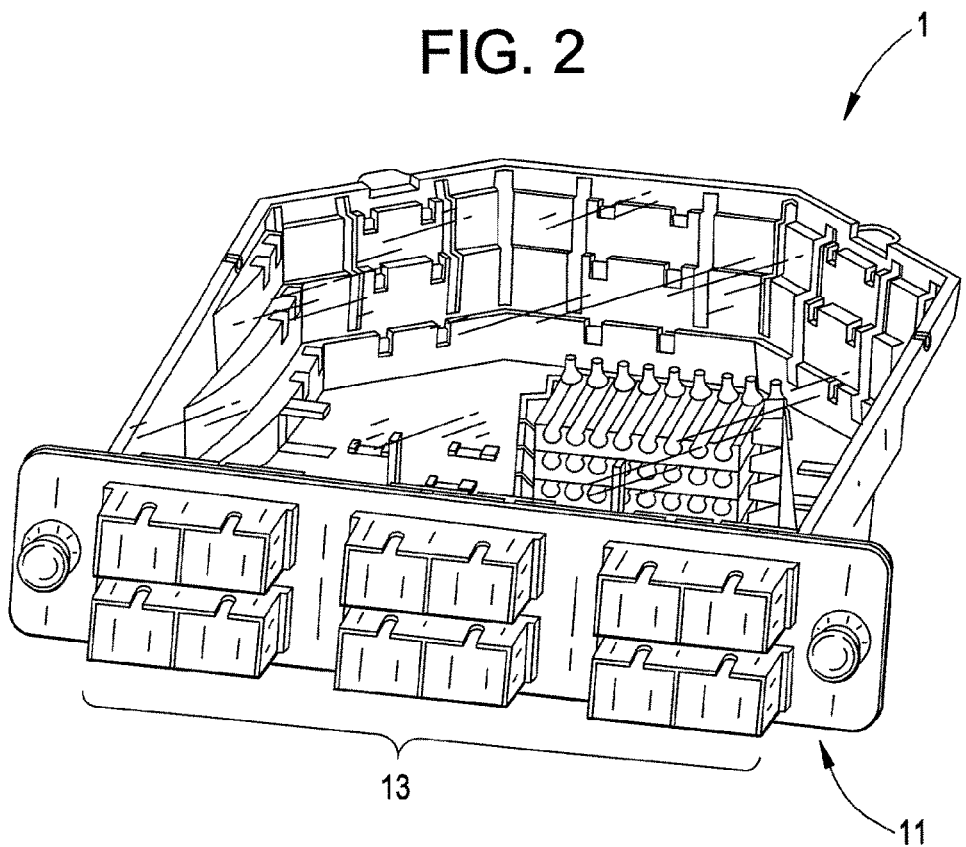
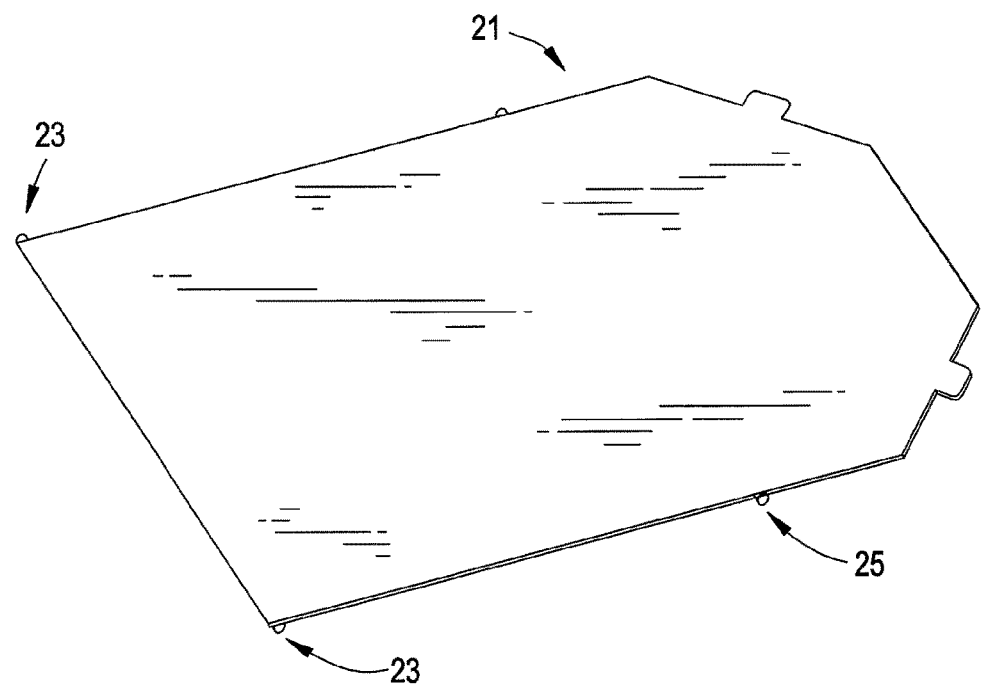

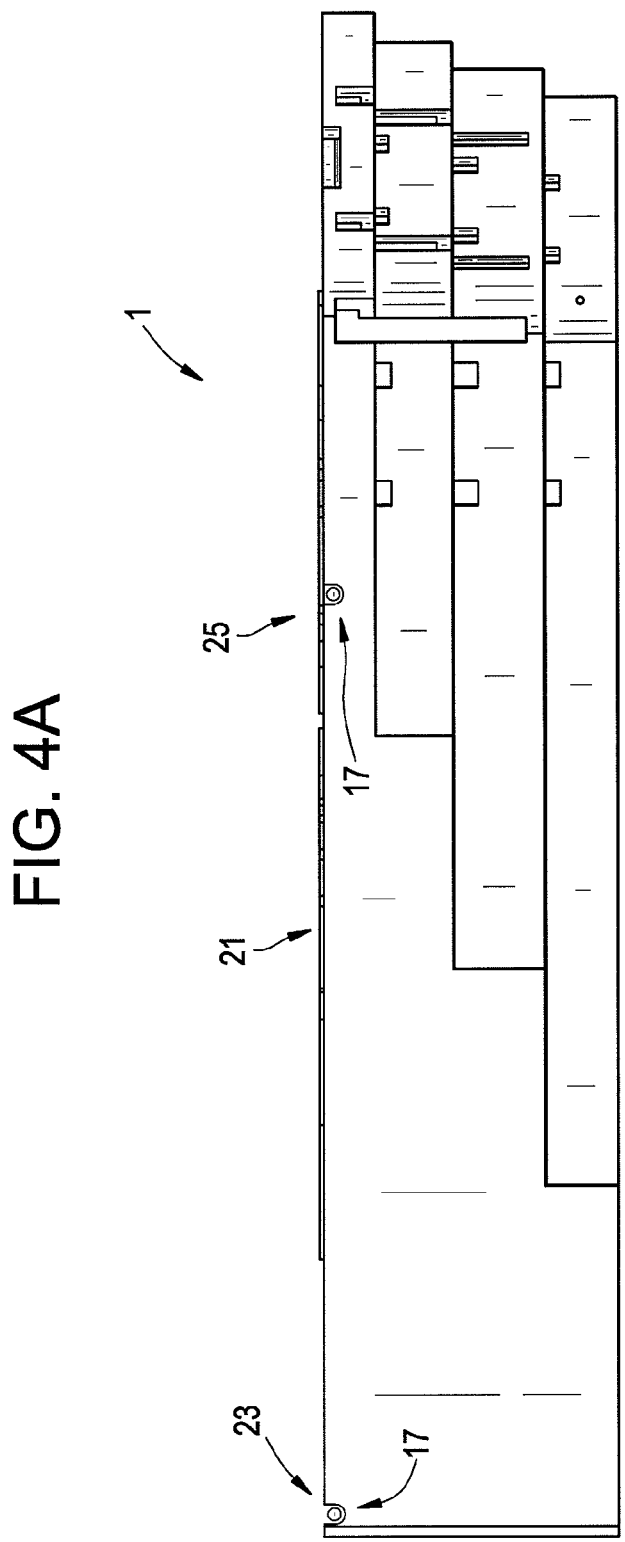

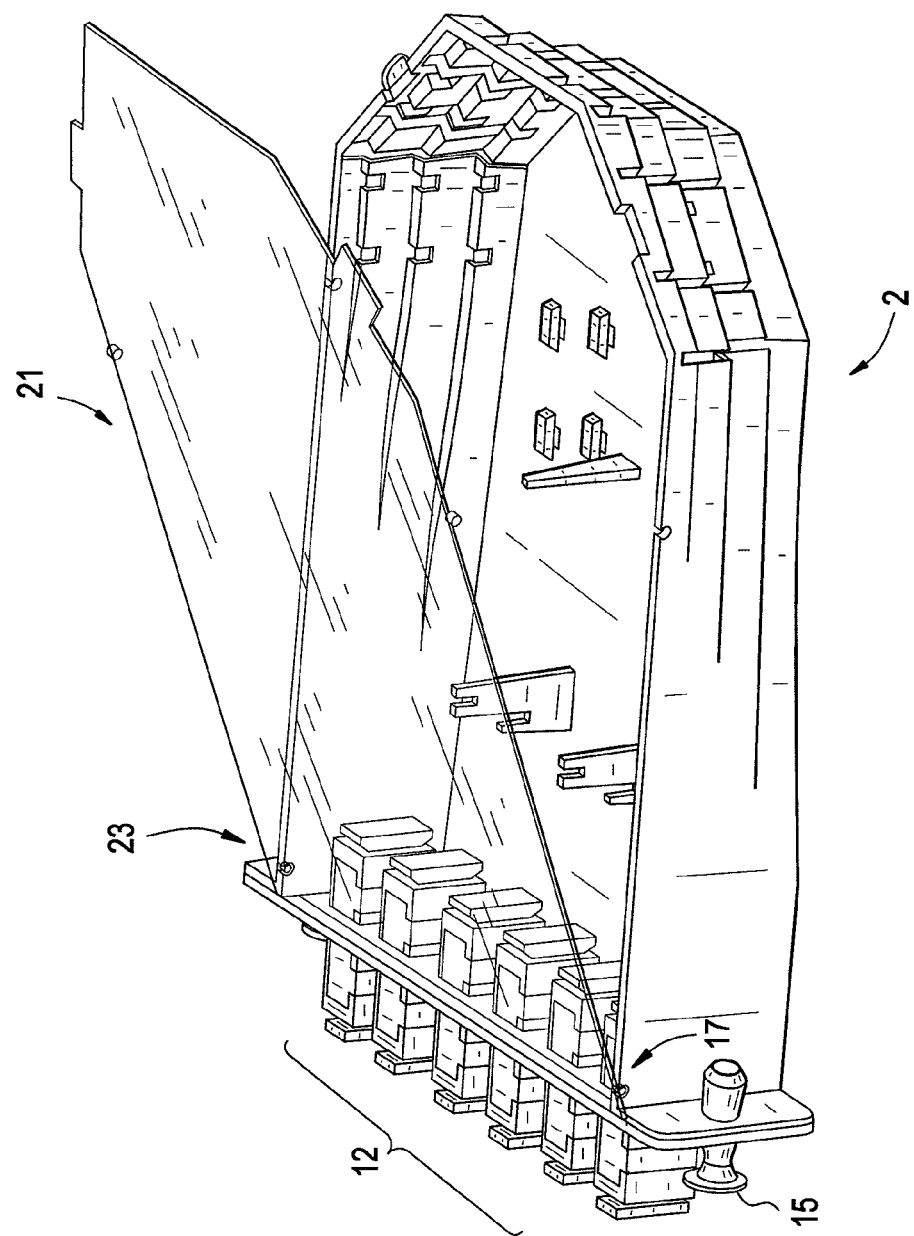

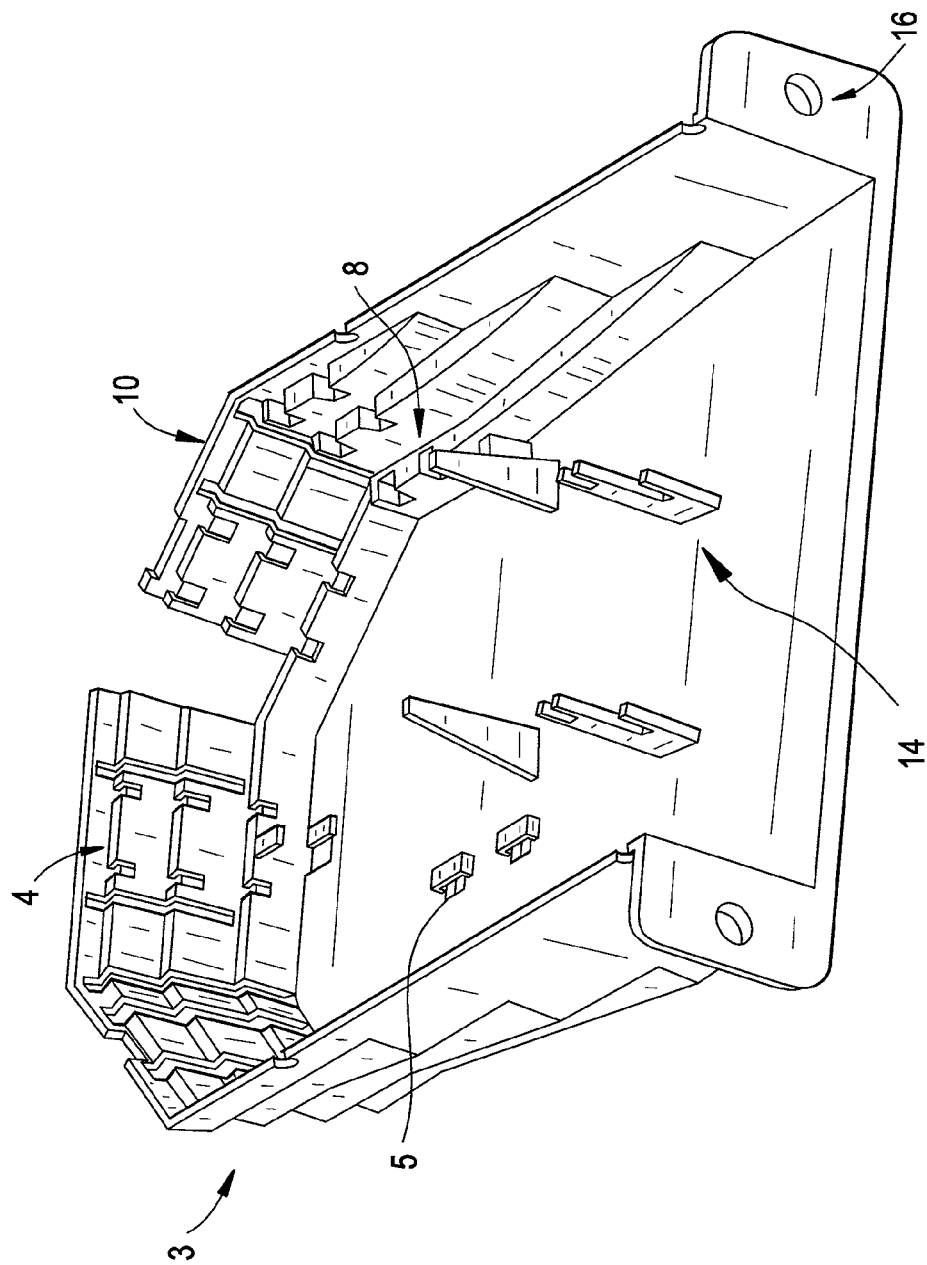

FIELD INSTALLABLE OPTICAL MODULE WITH CONFIGURABLE CABLE ATTACHMENT

CROSS-REFERENCE TO RELATED APPLICATIONS

This application is based upon and claims the benefit of priority from U.S. Provisional Application No. 61/707,643, filed Sep. 28, 2012, and from U.S. Provisional Application No. 61/762,488, filed Feb. 8, 2013, in the United States Patent and Trademark Office, the disclosures of which are incorporated herein in their entirety by reference.

BACKGROUND

1. Field

The invention relates to a cable adaptor case, and more particularly to a cable adapter case for sorting cables.

2. Background

Existing patch and splice cassette modules are not space-efficient. Most offerings on the market do not conform to the standard LGX118 footprint. The most popular offerings utilize multi-component assemblies which can be cumbersome from a fiber management standpoint. Existing technology uses moving parts which can place the fiber at risk for damage. Current offerings require tie-wraps to secure incoming cable. This approach is very time-consuming and requires multiple consumable items.

Current patch and splice modules offer one of two options: 1) a stationary splice sleeve holder that cannot be removed from the module. This makes installation very difficult because it is much easier to mount the splices into the splice sleeve holder when it is not inside of the module (not much hand room inside the module). 2) an open splice sleeve holder that can be removed from the module. This can pose problems because splice sleeves can easily fall out of conventional splice sleeve holders. This is because such splice sleeve holders are made out of flimsy rubber that bends when being mounted into or removed from the patch and splice module. When this rubber bends the splice sleeves can easily pop out which in turn increases the time of installation and even can lead to fiber damage.

Other disadvantages and limitations include: (1) Cable entry/access is limited; (2) Cables coming into the module can only enter in through certain directions/angles/entry ports; (3) Traditional patch and splice modules do not do a good job of managing ribbon fiber; and (4) Existing cassette modules accept proprietary or custom sized adapter plates.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

One embodiment of the present invention utilizes a cable adaptor case including a cable tray which holds a plurality of cables, and an adaptor tray removably attached to the cable tray. The cable tray may include steps which hold the plurality of cables and with cable clips which secure the plurality of cables to the cable tray. The adaptor tray may include adaptors which connect the plurality of cables.

Other features of the embodiment may include the cable tray with splice holders which hold spliced cables and splice slots which hold the plurality of splice holders.

Another embodiment of the invention may include the splice holders having a splice sorter which holds and sorts the spliced cables, a splice holder adaptor which holds the splice sorter and is removably attached to the splice slots, and a splice cap which covers the spliced cables in the splice sorter and the splice sorter.

Other features of the embodiment may include the steps having removable breakout portions through which the plurality of cables enter the cable tray.

Other features of the embodiment may include the steps having holes which attach the first plurality of wires to the plurality of steps.

Other features of the embodiment may include a lid which encloses the top of the cable tray.

Another embodiment of the invention may include the cable tray having receivers for receiving the lid.

Other features of the embodiment may include the lid having snaps removably attached to the receivers of the cable tray, and hinges both hingably attached and removably attached to the receivers of the cable tray.

Other features of the embodiment may include the cable tray having a plurality of hooks which secure the cables to the cable tray.

Other features of the embodiment may include the cable tray having towers which sort and organize the cables.

Other features of the embodiment may include the cable tray having screw receivers in a direction opposite the steps which receive the adaptor plate.

Another embodiment of the invention may include screws removably attached to screw adaptors which removably attach the adaptor plate to the plurality of screw receivers.

BRIEF DESCRIPTION OF THE DRAWING

FIG. 2 is an isometric view of an exemplary embodiment of a cable adaptor case 1 and an isometric view of an exemplary embodiment of a lid 21.

FIG. 4a is a side view of an exemplary embodiment of a cable tray 2 comprising a lid 21.

FIG. 5 is an isometric view of an exemplary embodiment of a cable tray 2 comprising a lid 21 hingably attached to the cable tray 2 and an adaptor plate 11.

FIG. 6 is an isometric view of an exemplary embodiment of a cable tray 2 wherein a lid 21 and an adaptor plate 11 are not attached.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

The invention does not contain any moving parts (i.e.: hinges, etc). An advantage to this design is simplicity—minimal number of parts involved. More specifically, an exemplary embodiment of the invention possesses four fundamental components to ensure simplicity: an adapter plate to assist with fiber optic interconnectivity, a body/lid to provide a protected environment for fiber optic components, a splice sleeve holder for the management and mounting of fiber optic splices, and a cable mounting clip for the time-efficient installation and mounting of fiber optic cable.

Figure 1:
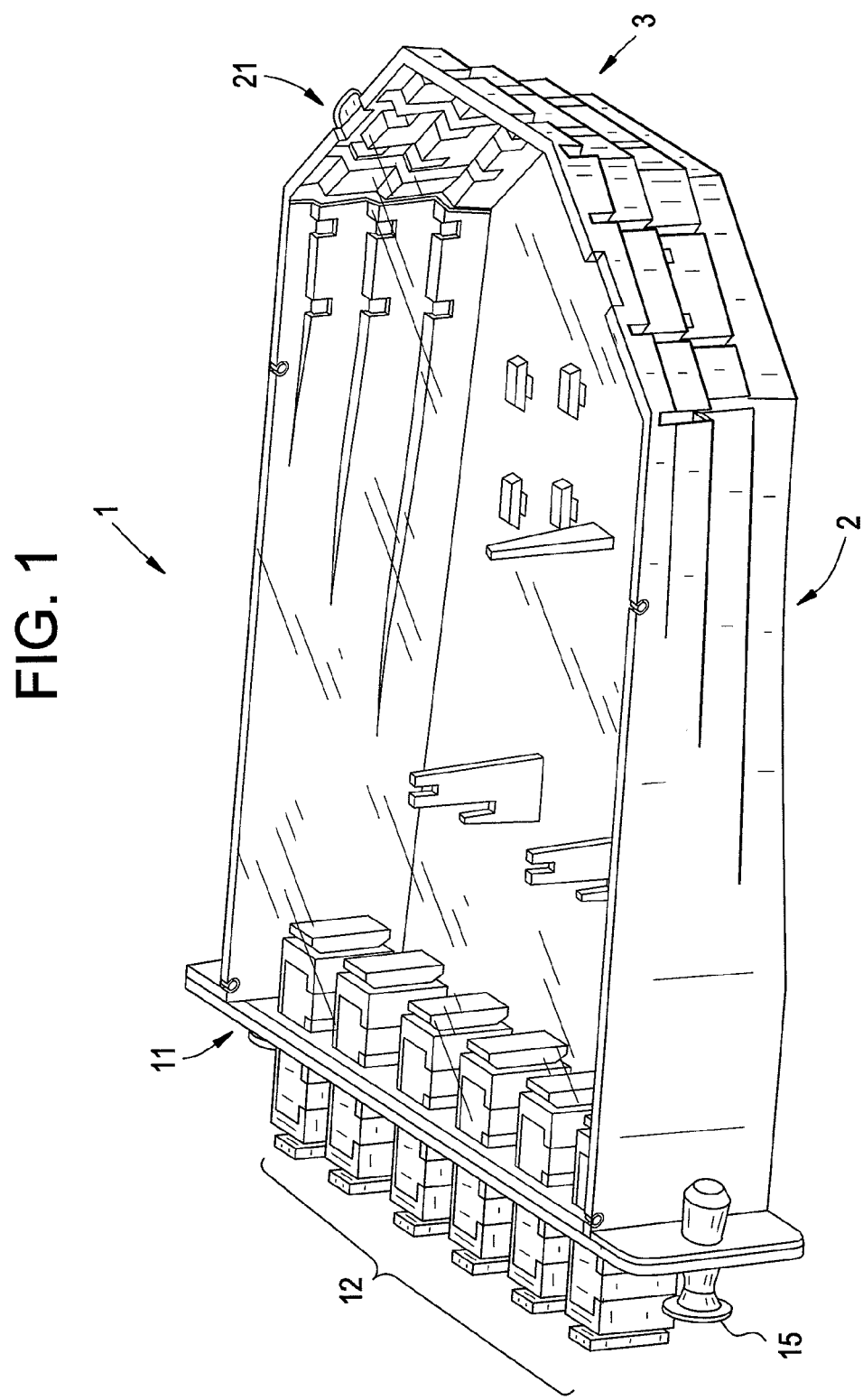
FIG. 1 is an isometric view of an exemplary embodiment of a cable adaptor case 1

Referring to the drawings, FIG. 1 is an isometric view of an exemplary embodiment of a cable adaptor case 1. The cable adaptor case 1 includes a cable tray 2 for holding a plurality of cables, an adaptor tray 11, and a lid 21 which is removably attached and hingably attached to the cable tray. The cable tray 2 has a plurality of steps 3 for holding a plurality of cables. The adaptor tray 11 has a plurality of adaptors 12 for connecting cables from inside the cable tray 2 to a set of cables outside of the cable tray 2. The adaptor tray 11 is removably attached to the cable tray 2. In an exemplary embodiment, the cable tray may be attached by a screw 15. The adapter case 1 may be made of metal, plastic, or other similar materials.

FIG. 2 is an isometric view of an exemplary embodiment of a cable adaptor case 1 and an isometric view of an exemplary embodiment of a lid 21. The cable adaptor tray 11 may have any variety of a plurality of adaptors. In an exemplary embodiment, a plurality of adaptors 13 is embedded in the adaptor tray 11. The plurality of adaptors 13 shown in FIG. 2a are different from the plurality of adaptors 12 of FIG. 1. In an exemplary embodiment, the adaptor tray 11 may be an industry standard LGX 118 panel. The lid 21 comprises a plurality of snaps 25, which are removably attached to the cable tray 2, and a plurality of hinges 23, which are removably attached and hingeably attached to the cable tray 2. In an exemplary embodiment, the tray 21 of FIG. 2 shows two hinges 23 and two snaps 25.

Figure 3:
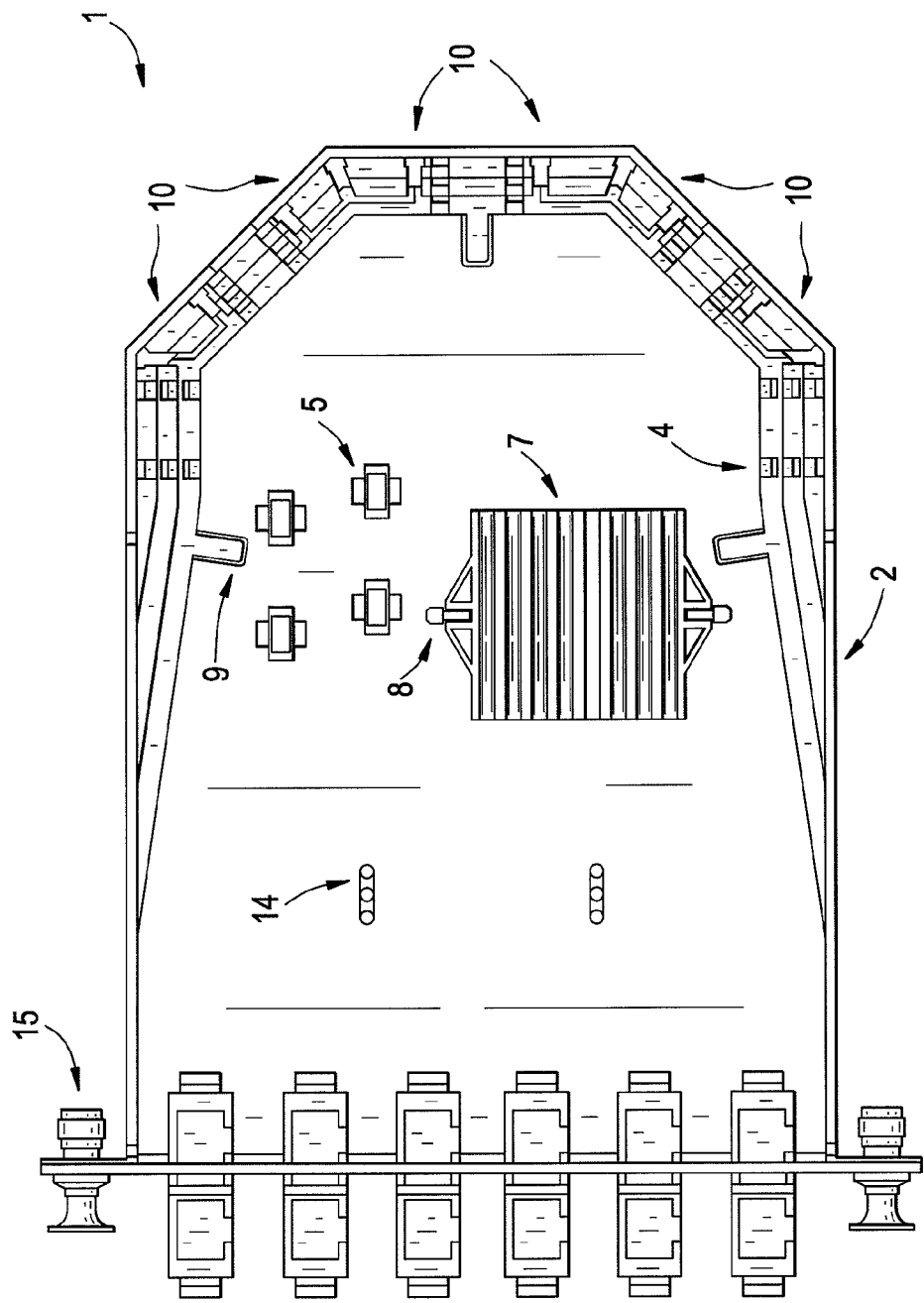
FIG. 3 is an overhead view of an exemplary embodiment of a cable tray 2.

FIG. 3 is an overhead view of an exemplary embodiment of a cable tray 2. The cable tray 2 includes a plurality of bridges 5 for securing a plurality of cables, a splice holder 7 for holding spliced cables, a plurality of splice slots 8 for holding the splice holder 7, a plurality of hooks 9 to secure a plurality of cables, a plurality of breakout portions 10, and a plurality of towers 14 for sorting a plurality of cables. In an exemplary embodiment the splice holder 7 is made of plastic and has a plurality of rows which has a plurality of divots for receiving the spliced cables. In an exemplary embodiment, once the plurality of divots have received the spliced cables, the plurality of rows are stacked on top of one another and fit into the plurality of splice holders 8 for securing the spliced cables. The plurality of breakout portions 10 may be broken by an operator to allow for entry of a plurality of cables into the cable tray 2. A plurality of cables may enter from various positions into the cable tray 2 depending upon which one of the plurality of breakout portions is broken by an operator.

FIG. 4a is a side view of an exemplary embodiment of a cable tray 2 comprising a lid 21. Both the plurality of snaps 25 and the plurality of hinges 23 are removably attached to a plurality of receivers 17 in the cable tray 2. In an exemplary embodiment, the plurality of hinges are removably attached to the cable tray 2.

Figure 4B:
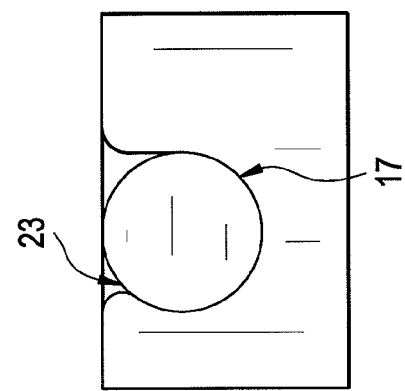
FIG. 4b is a close-up side view of an exemplary embodiment of a cable tray 2 comprising a hinge 23 removably attached to a receiver 17 of the cable tray 2.

FIG. 4b is a close-up side view of an exemplary embodiment of a cable tray 2 with a hinge 23 removably attached to a receiver 17 of the cable tray 2.

Figure 4C:
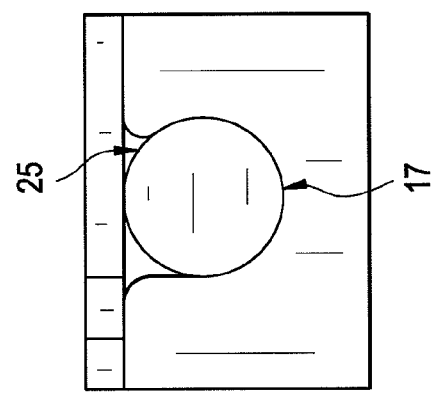
FIG. 4c is a close-up side view of an exemplary embodiment of a cable tray 2 comprising a tab 25 removably attached to a receiver 17 of the cable tray 2.

FIG. 4c is a close-up side view of an exemplary embodiment of a cable tray 2 with a snap 25 removably attached to a receiver 17 of the cable tray 2.

Figure 4D:
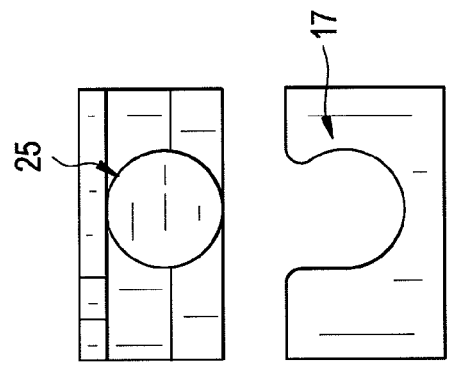
FIG. 4d is a close-up side view of an exemplary embodiment of a cable tray 2 comprising a tab 25 removed from a receiver 17 of the cable tray 2.

FIG. 4d is a close-up side view of an exemplary embodiment of a cable tray 2 with a snap 25 removed from a receiver 17 of the cable tray 2.

FIG. 5 is an isometric view of an exemplary embodiment of a cable tray 2 with a lid 21 and an adaptor plate 11. The lid 21 is shown to be hingeably attached by the plurality of hinges 23 to the plurality of receivers 17 of the cable tray 2. The snaps 25 are removed from the plurality of receivers 17.

FIG. 6 is an isometric view of an exemplary embodiment of a cable tray 2 wherein a lid 21 and an adaptor plate 11 are not attached. In an exemplary embodiment, as shown in FIG. 6, one of the plurality of breakout portions 10 is removed. An adaptor plate 11 may be attached to a plurality of adaptor plate receivers 16 of the cable tray 2. In addition, the plurality of steps 3 of the cable tray 2 has a plurality of holes 4. In an exemplary embodiment, a plurality of cables may be attached to the plurality of steps 3 by using a zip-tie, which is fed through the plurality of holes 4, to wrap around the plurality of cables.

Figure 7:
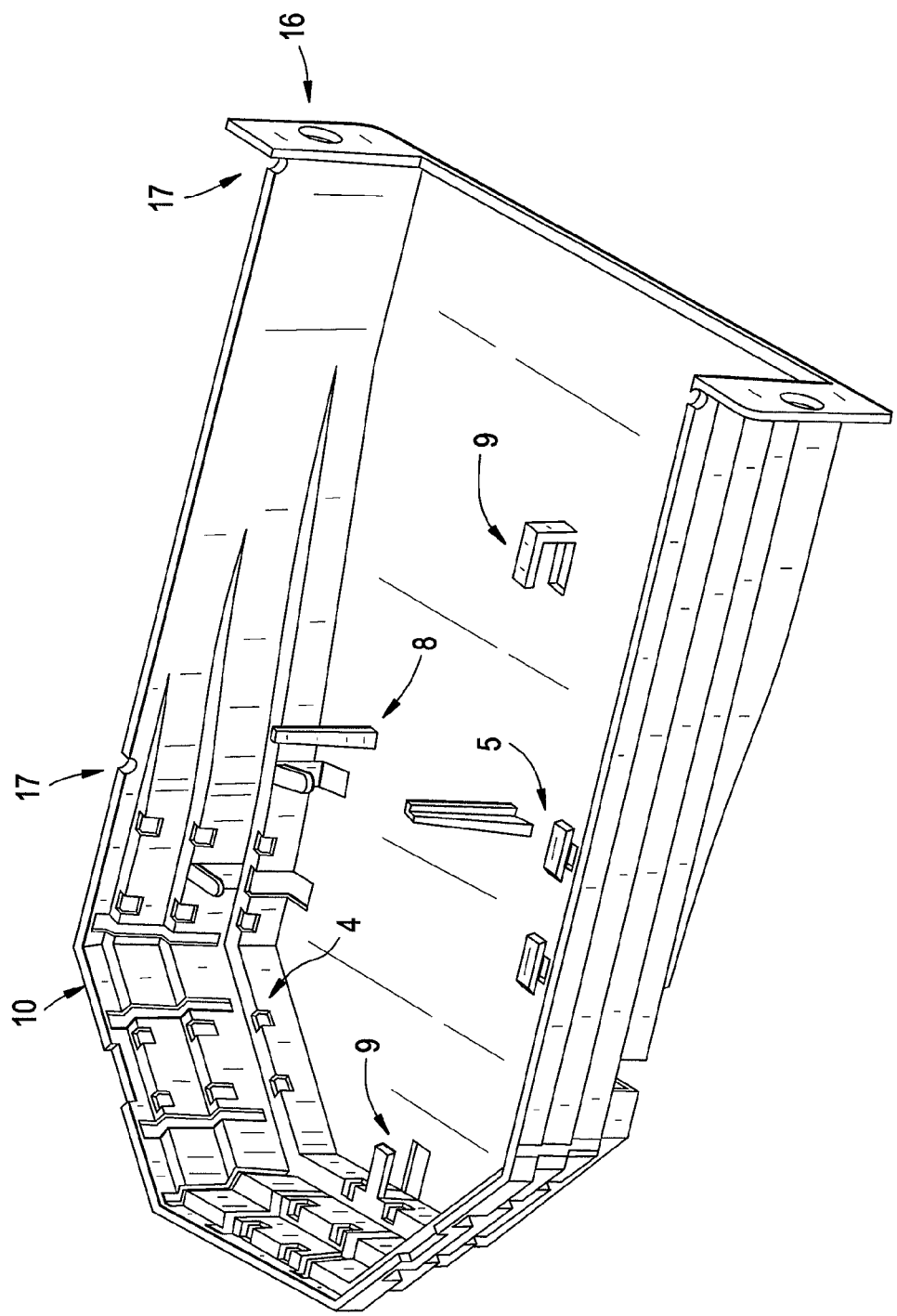
FIG. 7 is an isometric view of an exemplary embodiment of a cable tray 2 wherein a lid 21 and an adaptor plate 11 are not attached.

FIG. 7 is an isometric view of an exemplary embodiment of a cable tray 2 wherein a lid 21 and an adaptor plate 11 are not attached. In an exemplary embodiment, additional hooks 9 is formed in a position away from the plurality of steps 3.

Figure 8:
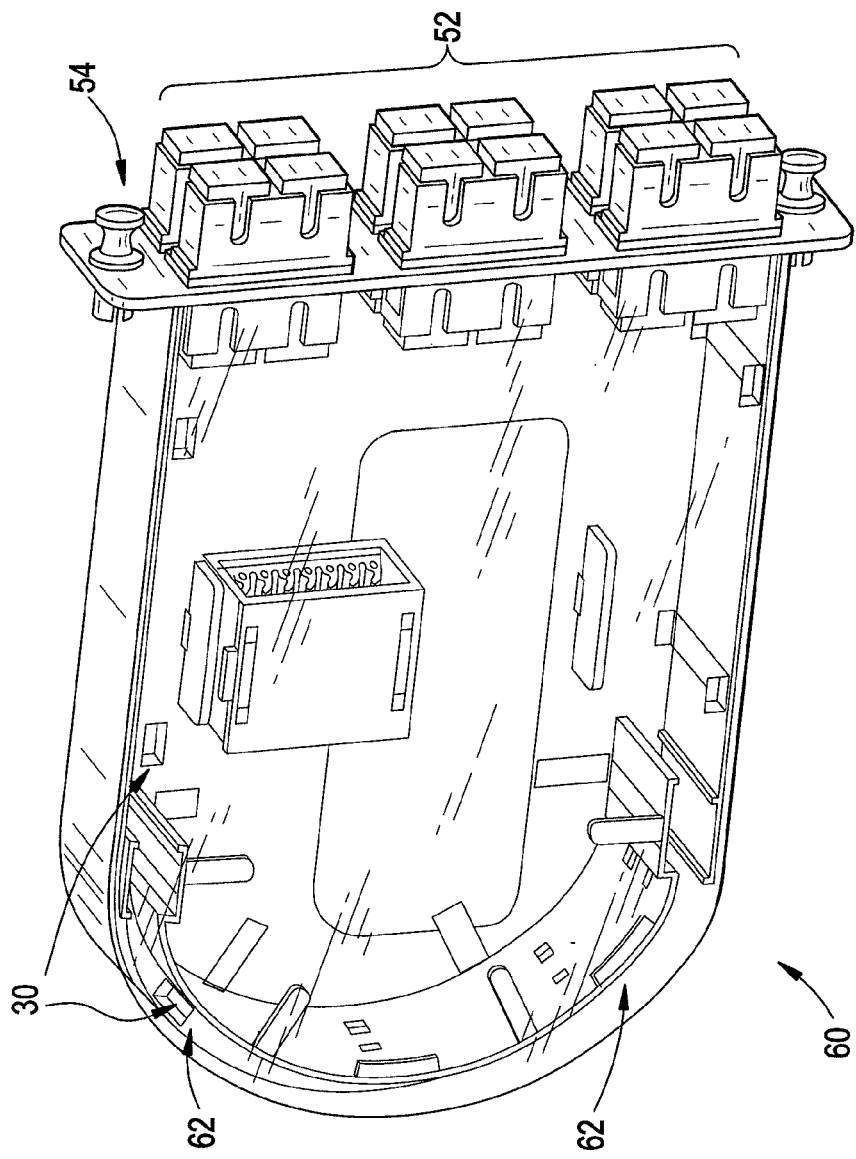
FIG. 8 is an isometric view of a second exemplary embodiment of a cable tray 29 wherein a lid 60 comprises receiving sections 29 and the cable tray 29 comprises protruding sections 30.

FIG. 8 is an isometric view of a second exemplary embodiment of a cable tray 29, wherein a lid 60 has receiving sections 62, and the cable tray 29 including protruding sections 30. In an exemplary embodiment, the protruding sections 30 interact with the receiving sections 62 so that the lid 60 is removably attached to the cable tray 29. In an exemplary embodiment, the lid 60 may be removed by sliding the lid 60 away from the plurality of adaptors 52.

Figure 9:
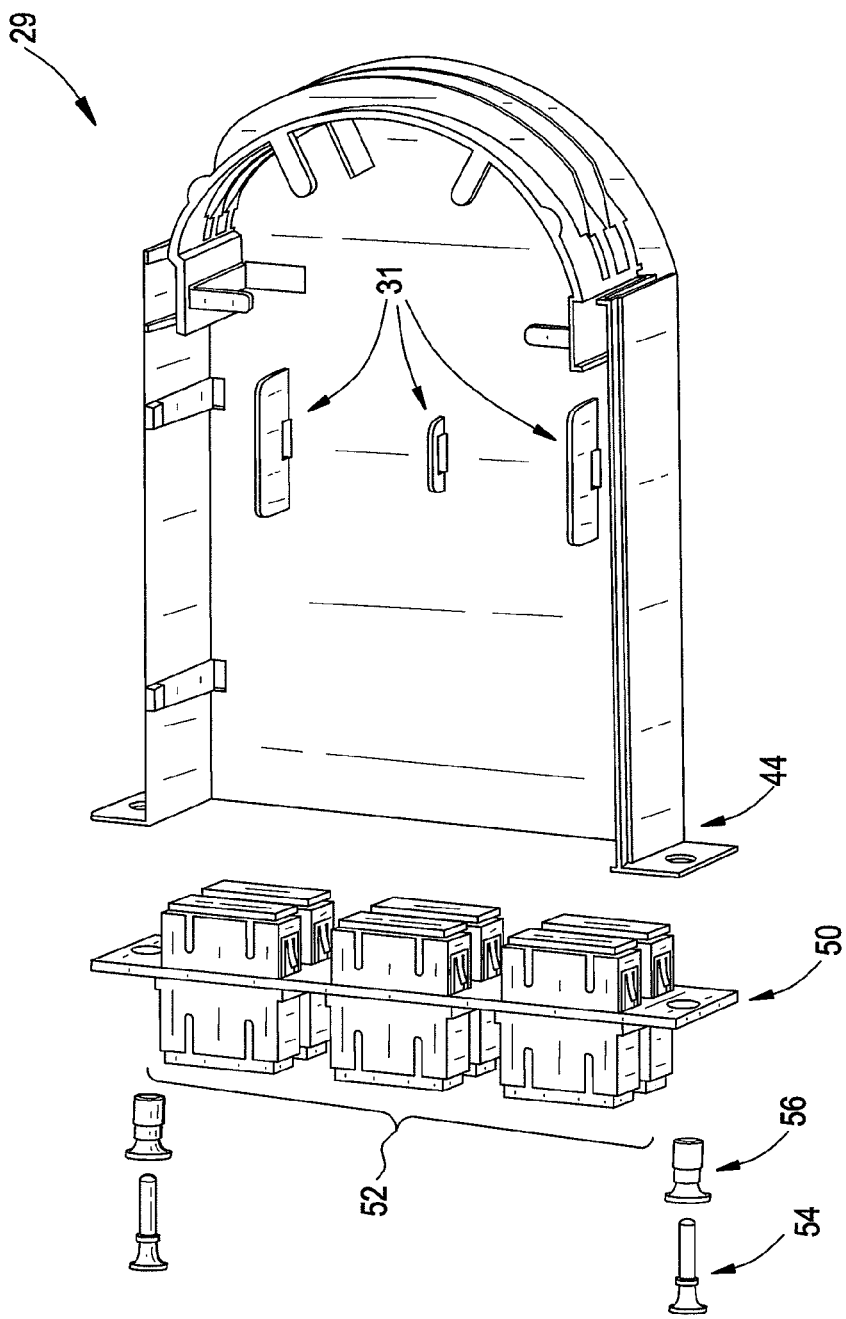
FIG. 9 is an isometric view of a second exemplary embodiment of a cable tray 2 and an adaptor tray 50 detached from the cable tray 29.

FIG. 9 is an isometric view of a second exemplary embodiment of a cable tray 29 and an adaptor tray 50 detached from the cable tray 29. In an exemplary embodiment, a plurality of screws 54 removably attach to a plurality of screw adaptors 56 for removably attaching the adaptor plate 50 to a plurality of screw receivers 44. A second exemplary embodiment of a plurality of splice slots 31 is provided in the cable tray 29. The splice slots 31 in FIG. 9 are configured for holding two splice holders 32.

Figure 10:
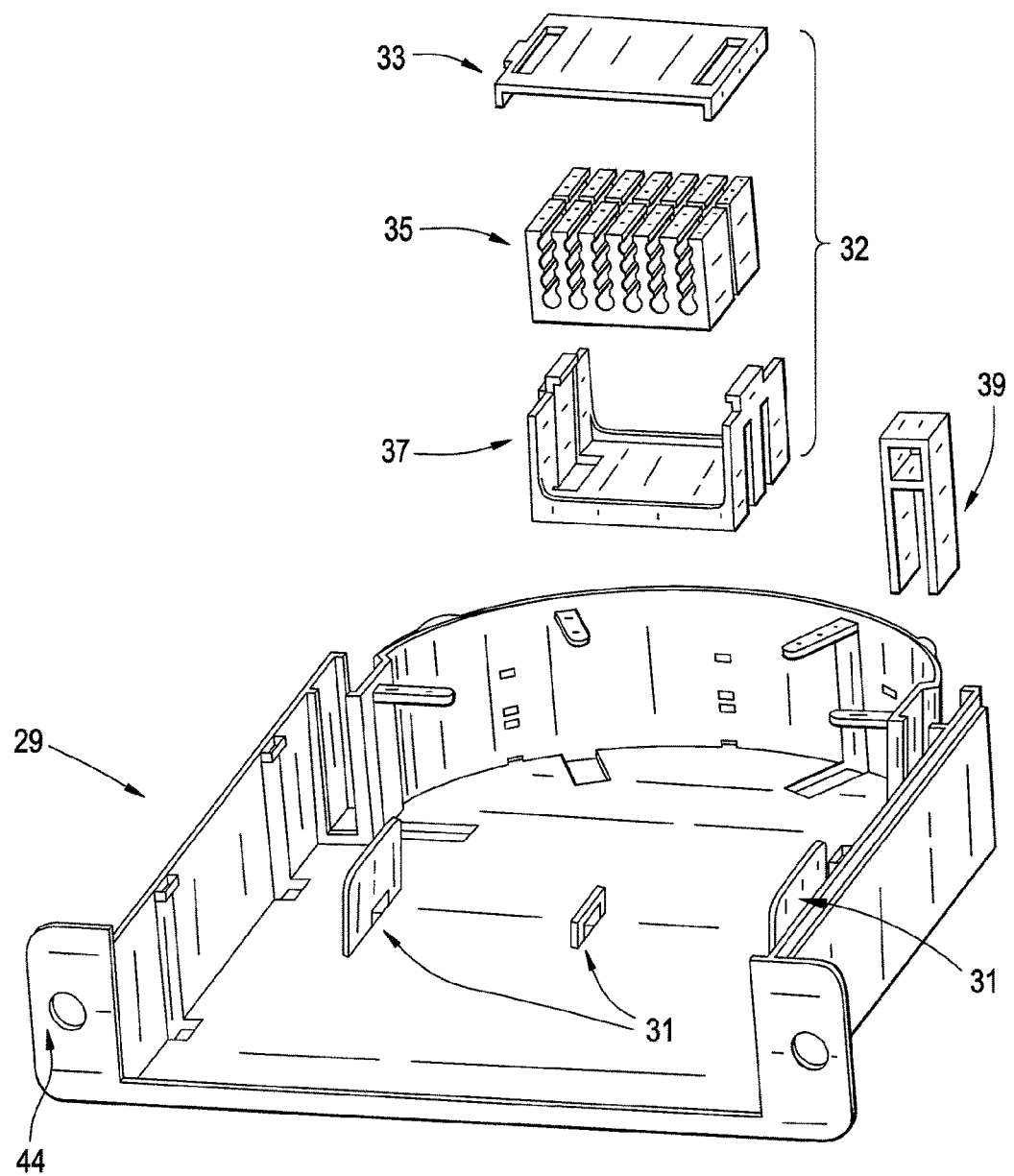
FIG. 10 is an isometric view of a second exemplary embodiment of a cable tray 29 and a second exemplary embodiment of a splice holder 32 detached from the cable tray 29.

FIG. 10 is an isometric view of a second exemplary embodiment of a cable tray 29 and a second exemplary embodiment of a splice holder 32 detached from the cable tray 29. In an exemplary embodiment, the splice holder 32 has a splice sorter 35 for holding and sorting cables which have been spliced, a splice holder adaptor 37 for adapting the splice sorter 35 to be removably attached to the splice slots 31, and a splice cap 33 for protecting the wires in the splice sorter 35 and for covering the splice sorter 35. In an exemplary embodiment, the splice sorter 35 of FIG. 10 is made of one piece of plastic, as opposed to a plurality of rows of the splice holder 7 of FIG. 3.

In an exemplary embodiment, as shown in FIG. 10, the splice sorter can hold up to 24 spliced wires. In an exemplary embodiment, the splice holder 32 can hold both single fusion and ribbon splice sleeves. In an exemplary embodiment, the splice holder 32 provides a secure mounting area for splices (i.e. splices will not pop out). In an exemplary embodiment, the splice holder 32 is removable by a "snap-in/snap-out" feature. This feature makes installation easier since splice sleeves can be loaded into the splice sleeve holder outside of the patch and splice module. In an exemplary embodiment, as shown in FIG. 10, the cable tray 29 has a cable clip 39 for holding cables.

Figure 11:
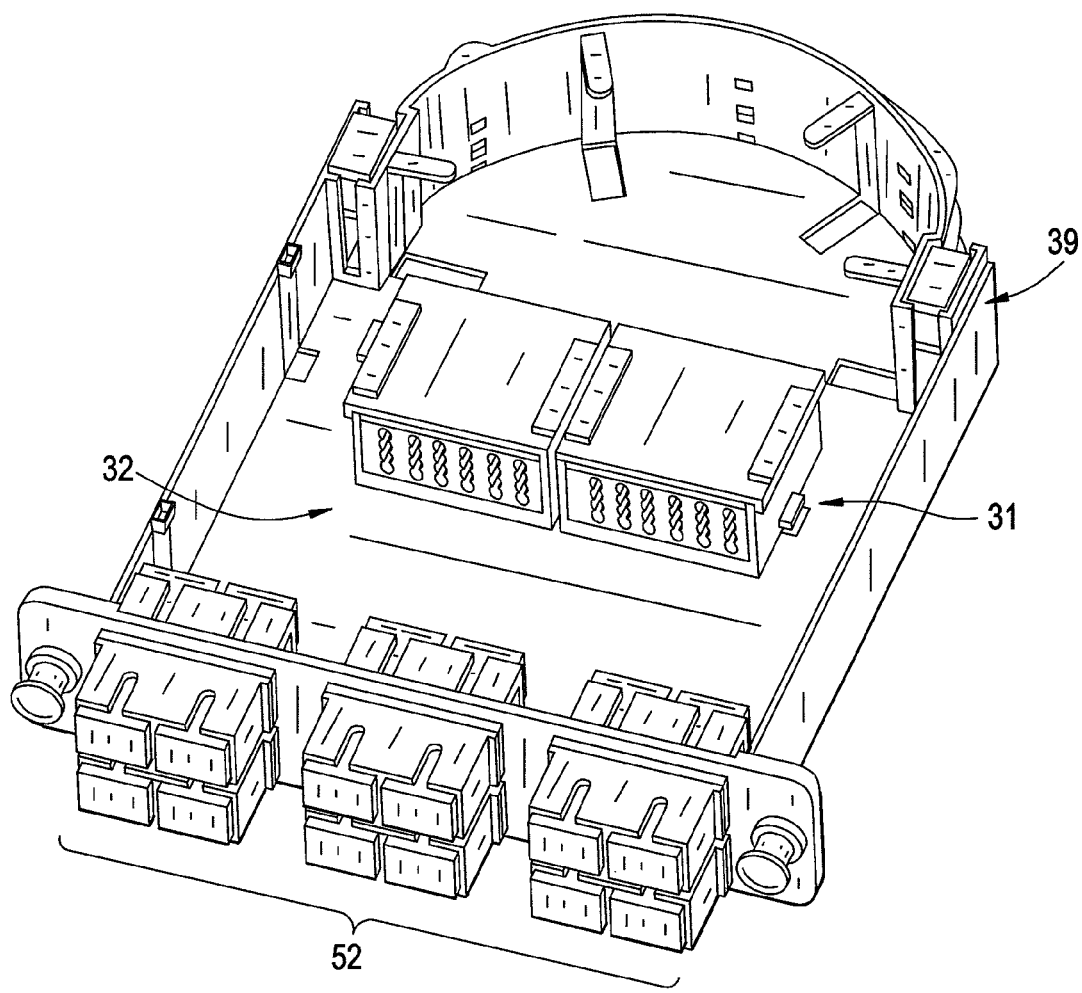
FIG. 11 is an isometric view of a second exemplary embodiment of a cable tray 29 wherein a plurality of splice holders 32 and a plurality of cable clips 39 interact with the cable tray 29.

FIG. 11 is an isometric view of a second exemplary embodiment of a cable tray 29 wherein a plurality of splice holders 32 and a plurality of cable clips 39 interact with the cable tray 29. In an exemplary embodiment, two splice holders 32 are shown to be removably attached to the splice slots 31. In an exemplary embodiment, the cable clips 39 are shown to be removably attached to the cable tray 29. In an exemplary embodiment, the cable clips 39 secure a plurality of cables which exit the cable tray 29. In an exemplary embodiment, the cable tray 29 allows a plurality of cables to enter into the back of the module across a 180 degree sweep. In a more specific exemplary embodiment, the back of the cable tray 29 consists of a tiered semi-circular geometry that allows fiber optic cable to enter into two, separate entry ports.

Figure 12:
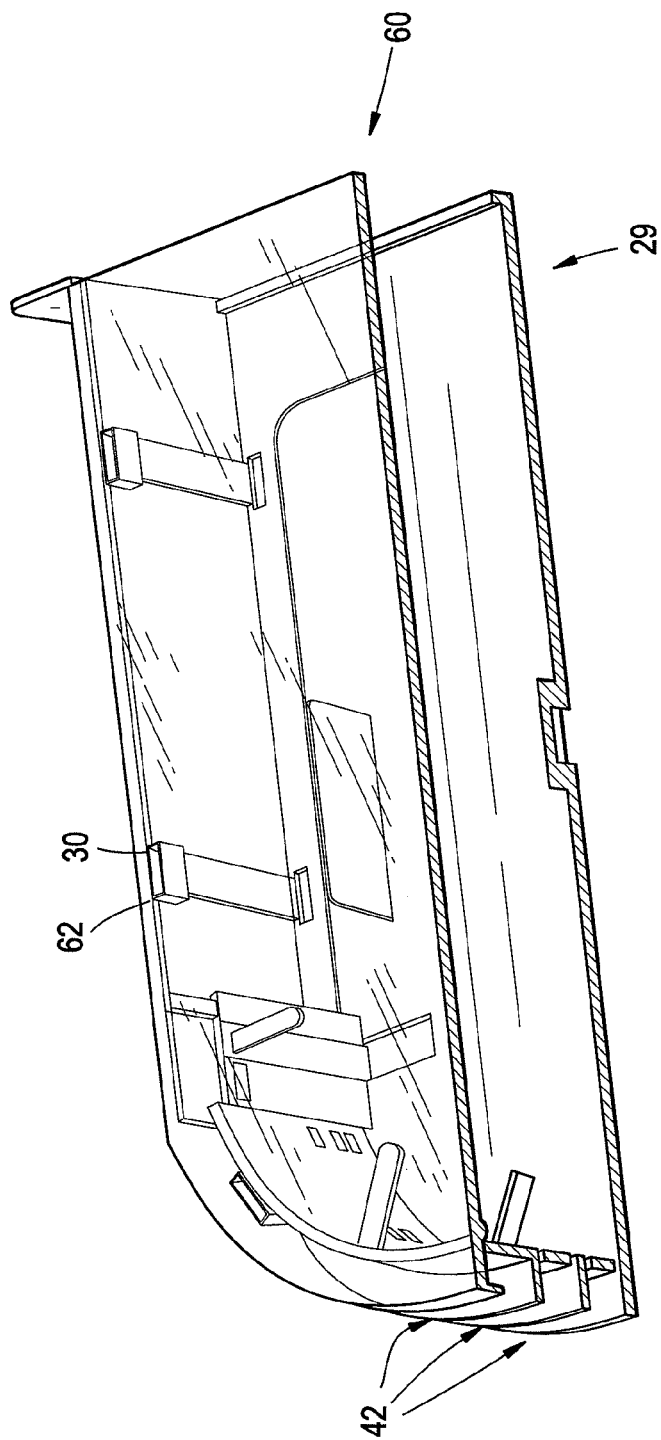
FIG. 12 is an isometric section view of a second exemplary embodiment of a cable tray 29 with a lid 60 removably attached to the cable tray 29.

FIG. 12 is an isometric section view of a second exemplary embodiment of a cable tray 29 with a lid 60 removably attached to the cable tray 29. In an exemplary embodiment, the cable tray 29 has a plurality of steps 42 for securing a plurality of cables. In an exemplary embodiment, once the cable clips 39 have secured the plurality of cables, the cables exit the cable tray 29 and are secured on the plurality of steps 42 in a direction of the plurality of steps 42. An exemplary embodiment of the design of the cable clips 39 provides adequate pull tension while minimizing the time of installation. In an exemplary embodiment, the clips 39 can be manufactured from semi-rigid plastic or rubber type materials to provide adequate amount of grip to the various types of tubing materials used to house the plurality of cables. An exemplary embodiment of the invention utilizes a lid 60 that slides and snaps into place maintaining the compression of the clips 39 and maintaining integrity. In an exemplary embodiment, the lid 60 can optionally be hinged to provide access without removal of the lid 60.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

What is claimed is:

1. A cable adaptor case comprising:
a cable tray configured to hold a plurality of cables; and
an adaptor tray removably attached to the cable tray,
wherein the cable tray comprises a base wall and a sidewall, the base wall spaced from a top of the cable tray along an axis, and wherein the cable tray further comprises a plurality of steps spaced apart between the base wall and the top of the cable tray in a direction along the axis, the plurality of steps configured to hold the plurality of cables, the plurality of steps formed by an exterior surface of the sidewall such that the steps are on an exterior of the cable tray;
a plurality of cable clips configured to secure the plurality of cables to the cable tray, each of the plurality of cable clips removably insertable in the direction along the axis into one of a plurality of channels defined in the cable tray, the plurality of channels extending in the direction along the axis, and wherein an entry port into the cable tray is defined at each of the plurality of channels, each entry port transverse to the direction along the axis; and
wherein the adaptor tray comprises a plurality of adaptors configured to connect the plurality of cables.

2. The cable adaptor case of claim 1, wherein the cable tray further comprises a plurality of splice holders configured to hold spliced cables.

3. The cable adaptor case of claim 2, wherein the cable tray further comprises a plurality of splice slots, the plurality of splice holders removably attached to the plurality of splice slots.

4. A cable adapter case comprising:
a cable tray configured to hold a plurality of cables; and
an adapter tray removably attached to the cable tray;
wherein the cable tray comprises a base wall and a sidewall, the based wall spaced from a top of the cable tray along an axis, a plurality of splice slots extending from the base wall towards the top of the cable tray, and a plurality of splice holders removably attached to the plurality of splice slots, and wherein the cable tray further comprises a plurality of steps spaced apart between the base wall and the top of the cable tray in a direction along the axis, the plurality of steps configured to hold the plurality of cables, the plurality of steps formed by an exterior surface of the sidewall such that the steps are on the exterior of the cable tray;
a plurality of cable clips configured to secure the plurality of cables to the cable tray, each of the plurality of cable clips removably insertable in the direction along the axis into one of a plurality of channels defined in the cable tray, the plurality of channels extending in the direction along the axis, and wherein an entry port into the cable tray defined at each of the plurality of channels, each entry port transverse to the direction along the axis;

wherein the adapter tray comprises a plurality adaptors configured to connect the plurality of cables; and wherein each splice holder of the plurality of splice holders comprises:
- a splice sorter comprising a plurality of fingers and a plurality of receptacles defined between adjacent fingers of the plurality of fingers, each receptacle configured to hold a plurality of the spliced cables, whereby the spliced cables are sorted into separate columns when the spliced cables are held within the receptacles;
- a splice holder adaptor directly attached to the splice sorter and directly removably attached to the splice slots; and
- a splice cap covering the splice sorter and configured to retain the spliced cables in the splice sorter.

5. The cable adaptor case of claim 1, wherein the plurality of steps comprises a plurality of removably breakout portions through which the plurality of cables enter the cable tray.

6. The cable adaptor case of claim 5, wherein the plurality of steps comprises a plurality of holes for attaching the plurality of cables to the plurality of steps.

7. The cable adaptor case of claim 1 further comprising a lid removably attached to and enclosing the top of the cable tray, the cable clips held within the channels by the lid when the lid is removably attached to the top of the cable tray.

8. The cable adaptor case of claim 7, wherein the cable tray further comprises a plurality of receivers, the lid removably attached to the top of the cable tray by the plurality of receivers.

9. The cable adaptor case of claim 8, wherein the lid further comprises a plurality of snaps configured to be removably attached to the receivers of the cable tray, and a plurality of hinges configured to be hingably attached and removably attached to the receivers of the cable tray.

10. The cable adaptor case of claim 1, wherein the cable tray further comprises a plurality of hooks configured to secure the plurality of cables to the cable tray.

11. The cable adaptor case of claim 1, wherein the cable tray further comprises a plurality of towers configured to sort and organize the plurality of cables.

12. The cable adaptor case of claim 1, wherein the cable tray further comprises a plurality of screw receivers opposite the plurality of steps configured to receive the adaptor plate.

13. The cable adaptor case of claim 12, wherein a plurality of screws are removably attached to a plurality of screw adaptors for removably attaching the adaptor plate to the plurality of screw receivers.

14. The cable adaptor case of claim 1, wherein the steps are tiered.

15. The cable adaptor case of claim 1, wherein the cable tray comprises a semi-circular sidewall and the steps extend from the sidewall.

16. The cable adaptor case of claim 1, wherein the cable tray comprises a semi-circular sidewall and the plurality of entry ports includes two entry ports positioned at opposing ends of the semi-circular sidewall.

17. A cable adaptor case comprising:
- a cable tray configured to hold a plurality of cables, the cable tray comprising a semi-circular sidewall and a plurality of tiered steps formed by an exterior surface of the semi-circular sidewall such that the steps are spaced apart along a first direction on an exterior of the semi-circular sidewall, the plurality of tiered steps configured to hold the plurality of cables, the cable tray further defining a plurality of entry ports, the plurality of entry ports oriented along a second direction transverse to the first direction;
- an adaptor tray removably attached to the cable tray, the adaptor tray comprising a plurality of adaptors configured to connect the plurality of cables; and
- a plurality of removable cable clips configured to secure the plurality of cables to the cable tray, each of the plurality of cable clips removably insertable into one of a plurality of channels defined in the cable tray and extending along the first direction, and wherein an entry port into the cable tray is defined at each of the plurality of channels.

18. The cable adaptor case of claim 17, wherein the cable tray further comprises a plurality of splice holders configured to hold spliced cables.

19. The cable adaptor case of claim 17 further comprising a lid for enclosing a top of the cable tray.

* * * * *